US012117154B1

(12) United States Patent
He

(10) Patent No.: US 12,117,154 B1
(45) Date of Patent: Oct. 15, 2024

(54) LED GLASS BULB AND MANUFACTURING METHOD THEREOF

(71) Applicant: Henan Yanxin Photoelectric Co., LTD, Puyang (CN)

(72) Inventor: Weimin He, Taizhou (CN)

(73) Assignee: Henan Yanxin Photoelectric Co., LTD, Puyang (CN)

( * ) Notice: Subject to any disclaimer, the term of this patent is extended or adjusted under 35 U.S.C. 154(b) by 0 days.

(21) Appl. No.: 18/501,086

(22) Filed: Nov. 3, 2023

(51) Int. Cl.
*F21V 31/00* (2006.01)
*F21K 9/90* (2016.01)
*F21V 3/06* (2018.01)

(52) U.S. Cl.
CPC .............. *F21V 31/005* (2013.01); *F21K 9/90* (2013.01); *F21V 3/061* (2018.02)

(58) Field of Classification Search
CPC ........... F21V 31/005; F21V 3/061; F21K 9/90
See application file for complete search history.

(56) References Cited

U.S. PATENT DOCUMENTS 11,002,423 B1 * 5/2021 Yang ..................... F21V 23/001
11,359,803 B2 * 6/2022 Yu ......................... F21V 19/004

FOREIGN PATENT DOCUMENTS

CN 105909996 A 8/2016
CN 108799871 A 11/2018

* cited by examiner

*Primary Examiner* — Karabi Guharay

(57) ABSTRACT

The present disclosure discloses a light-emitting diode (LED) glass bulb and a manufacturing process thereof. A key point of the technical solutions is as follows. By steps of preparation of a combined material, mounting of an LED lamp, welding of a glass package, seal test, secondary vacuum package of a glass bulb, waterproof test, power-on test, packaging of a qualified product, and the like, the important sealing treatment is performed on an LED bulb, so that the sealing property of a lamp housing is improved; the vacuum treatment is to prevent the LED lamp from being partially oxidized, which greatly prolongs the service life of the LED lamp; moreover, due to the waterproof test, the LED lamp can adapt to different severe environments; and by the final power-on test, the process can ensure a sufficient yield, which greatly improves the manufacturing effect of the manufacturing process.

8 Claims, 2 Drawing Sheets

LED GLASS BULB AND MANUFACTURING METHOD THEREOF

TECHNICAL FIELD

The present disclosure relates to the technical field of lighting fittings, and more particularly, to a light-emitting diode (LED) glass bulb and a manufacturing method thereof.

BACKGROUND

At present, some people pay more and more attention to holidays or family outdoor activities, and like to set up a whole meshed fancy light string group on a roof or a wall. When night falls, the light string presents flickering and moving light, to add joy to household residents.

In the existing technology, tungsten is used in bulbs as tungsten is the most ideal filament material. However, Christmas bulbs that use a tungsten filament as a luminescent material have problems such as low light efficiency, high power consumption, short lifespan, and easy breakage.

Later, people adopt an LED chip and the like, but the LED chip is not soft enough in illumination. A traditional LED glass bulb is poor in sealing property and has non-ideal waterproof performance. It is in an urgent need to provide a new solution of a novel manufacturing process of an LED glass bulb.

SUMMARY

For the shortcomings in the existing technology, the present disclosure aims to provide a manufacturing process of an LED glass bulb and an LED glass bulb. An illumination mode is changed into LED lighting. Furthermore, a manufactured and molded LED bulb has a good lighting effect and high stability. After air impermeability detection and waterproof performance detection are carried out, the service life and waterproof performance of the LED bulb can be greatly ensured, and the practicability can be greatly improved.

In order to achieve the above objective, the present disclosure provides the following technical solutions: A manufacturing process of an LED glass bulb specifically includes the following steps: S1, preparation of a combined material: processing, according to a size of a desired LED glass bulb, a lamp housing with a corresponding size, a glass package, and an LED lamp, wherein the lamp housing and the glass package are both made of a glass material;

- S2, mounting of the LED lamp: placing the lamp housing vertically on a fixture in a manner that an opening of the lamp housing is upward, then placing a wick portion of the LED lamp in the lamp housing, causing a lamp base portion of the LED lamp to pass through the glass package, and finally performing transition fit on the glass package and an opening portion of the lamp housing;
- S3, welding of the glass package: bonding the glass package with an inner wall of an opening in one side of the lamp housing through hot-melt bonding treatment, to connect the glass package to the lamp housing to form a semi-closed light-transmitting chamber;
- S4, seal test: performing detecting the sealing of a lamp bead obtained in step S3 through seal test equipment, wherein a main detection method is to test an air pressure inside the lamp bead obtained in step S3 through pressurization, depressurization, and alternate pressurization and depressurization; a detected qualified product is then moved to a next step, and a detected unqualified product is placed in an unqualified product region;
- S5, secondary vacuum package of the glass bulb: vacuumizing the light-transmitting chamber of the qualified product obtained in step S4, lowering the air pressure in the light-transmitting chamber to a set value, and heating and shrinking an opening in the other side of the lamp housing to achieve secondary vacuum package of the glass bulb;
- S6, waterproof test: putting the vacuumized lamp bead into a test pool, placing the lamp bead below a water surface, carrying out a waterproof test on the lamp bead in a manner of gradually increasing a water pressure, moving a detected qualified product to a next step, and placing a detected unqualified product into the unqualified product region;
- S7, power-on test: mounting the bulb on a live dedicated detection interface, checking whether a lighting portion of the LED bulb is lit up normally, moving a detected qualified product to a next step, and placing a detected unqualified product into the unqualified product region; and
- S8, packaging of the qualified product: packaging the qualified LED lamp obtained in step S7.

In a further setting of the present disclosure, the seal test of step S4 includes the following specific steps: S40, mounting a to-be-detected bulb on a detection fixture, wrapping a detection valve outside the bulb, setting the detection valve to be corresponding to a glass package detection hole, and clamping and fixing the lamp base through the detection valve;

- S41, setting both a maximum value of an air pressure change allowed in continuous pressurization and a maximum value of an air pressure change allowed in continuous depressurization to be K1, setting a maximum value of an air pressure change allowed in alternate pressurization and depressurization to be K2, and carrying out the seal test on the bulb after the setting;
- S42, in the pressurization or depressurization stage, performing a pressurization or depressurization operation in the chamber according to a selected detection mode, monitoring the chamber by an air pressure detector in the detection valve in real time, and recording leakage values of the bulb in different pressure change states; when an air pressure in the lamp bead reaches an extreme value of pressurization or depressurization, stopping pressurization or depressurization, and entering a pressure maintaining stage; then detecting a variation of the air pressure in the chamber, and recording a detected pressure variation to be K;
- S43, in the alternate pressurization and depressurization stage, controlling a pressure difference during the periodic pressurization and depressurization within ΔK, wherein within a time period T, a difference value between the highest pressure and the lowest pressure is less than ΔK; within the time period T, entering the pressure maintaining stage after the alternate pressurization and depressurization are carried out; then detecting a variation of the air pressure in the chamber, and recording a detected pressure variation to be Kt;
- S44, in a comparison stage, if K is less than or equal to K1 and Kt is less than or equal to K2, indicating that the bulb is qualified; otherwise, indicating that the bulb is unqualified; and S45, removing the tested bulb, and repeating steps S40 to S44.

In a further setting of the present disclosure, the waterproof test of step S6 includes the following specific steps: S60, placing the to-be-detected bulb on the detection fixture upside down, preparing a water reservoir, and clamping the lamp base through the detection fixture for the waterproof test;

S61, placing the bulb below a water surface of the water reservoir through the detection fixture for the waterproof test, and recording a state of a surface of the lamp bead;

S62, gradually increasing a water pressure of the water reservoir, setting a maximum water pressure value to be P, recording a state of the surface of the lamp bead; if there is an abnormality on the surface of the lamp bead, recording that there is a possibility of water leakage; and S63, after the test ends, detecting a bulb that is tested to be abnormal: first heating the bulb; controlling a heating temperature to be between 40° C. and 50° C. and heating time to be between 5 minutes and 10 minutes; after the heating is completed, adding room-temperature water to the surface of the bulb, observing changes in water mist in an inner cavity of the bulb; if there is water mist, indicating that the bulb is unqualified; and if there is no water mist, indicating that the bulb is qualified.

An LED glass bulb manufactured by the above manufacturing process of the LED glass bulb includes a lamp housing; the lamp housing is internally provided with a lighting chamber; an LED lamp is placed in the lighting chamber of the lamp housing; a lamp base portion of the LED lamp penetrates through a bottom end of the lamp housing and extends out of the lamp housing;

the lighting chamber of the lamp housing is a vacuum region; the lamp base portion of the LED lamp and the lamp housing are sealed by hot melting through a glass package; and the lamp housing and the glass package are both made of a glass material.

In a further setting of the present disclosure, the LED lamp is provided with a package body; the package body includes a coating structure arranged on the LED lamp and a reflection element arranged in the coating structure; and the coating structure is made of a resin material.

In a further setting of the present disclosure, the reflection element includes a curved reflection region composed of several curved lenses and a planar reflection region composed of several planar lenses.

In a further setting of the present disclosure, the LED lamp includes a first electrode and a second electrode; and the first electrode and the second electrode are respectively connected to pin portions in a one-to-one corresponding manner.

In a further setting of the present disclosure, the lamp housing is provided with a shrinking package structure; and the shrinking package structure is a package tip formed by vacuumizing the lamp housing and heating to shrink an opening on the side of the lamp housing.

In a further setting of the present disclosure, the LED lamp is a straight LED lamp or a patch LED lamp.

By the adoption of the above technical solutions, beneficial effects are as follows:

1. In the present disclosure, by the preparation of the combined material, the mounting of the LED lamp, the welding of the glass package, the seal test, the secondary vacuum package of the glass bulb, the waterproof test, the power-on test, the packaging of the qualified product, and the like, for the LED bulb, the glass package is welded to the LED lamp portion, and the secondary vacuum package is formed for the glass bulb. Due to the hot melting shrinking technology, vacuum treatment and package treatment are integrated, which achieves the integrality of the vacuum treatment and the shrinking package. The important step of sealing is integrated, which improves the sealing property of the lamp housing. The vacuum treatment is to prevent the LED lamp from being partially oxidized, which greatly prolongs the service life of the LED lamp. Moreover, due to the waterproof test, the LED lamp can adapt to different severe environments. By the final power-on test, the process can ensure a sufficient yield, which greatly improves the manufacturing effect of the manufacturing process.
2. In the manufacturing process of the present disclosure, due to the seal test, by the three manners: pressurization, depressurization, and alternate pressurization and depressurization, the sealing performance of the lamp housing can be ensured by the strength of the lamp housing in a vacuum state. The pressurization, the depressurization, and the alternate pressurization and depressurization can make adequate preparations for preventing oxidization, for example, vacuumizing the lamp housing or filling the lamp housing with inert gas. Pre-simulation of the seal test greatly ensures that the lamp housing can adapt to different manufacturing operations and can ensure the welding strength between the lamp housing and the glass package.
3. In the waterproof test of the present disclosure, an immersion method and a pressurization method are used for tests on different waterproof grades. Furthermore, by the step of first heating the bulb; controlling the heating temperature to be between 40° C. and 50° C. and the heating time to be between 5 minutes and 10 minutes; after the heating is completed, adding the room-temperature water to the surface of the bulb, observing changes in water mist in an inner cavity of the bulb; if there is water mist, indicating that the bulb is unqualified; and if there is no water mist, indicating that the bulb is qualified, the waterproof performance and practicability of the LED lamp are ensured.
4. The air impermeability, the waterproof performance, and the service life of the LED glass bulb manufactured by the manufacturing process of the present disclosure are all improved. Furthermore, in the LED glass bulb, the lighting chamber of the lamp housing is vacuumized, so that the oxygen content in the lamp housing is reduced, which prevents the LED lamp from being partially oxidized and prolongs the service life of the LED lamp. Moreover, in the present disclosure, the package body is used to package the LED lamp and cooperates with the reflection element arranged in the LED lamp. The reflection element includes the curved reflection region composed of the several curved lenses and the planar reflection region composed of the several planar lenses, so that the LED lamp has soft light, good lighting effect, simple structure, and high practicability.

Figure 1:
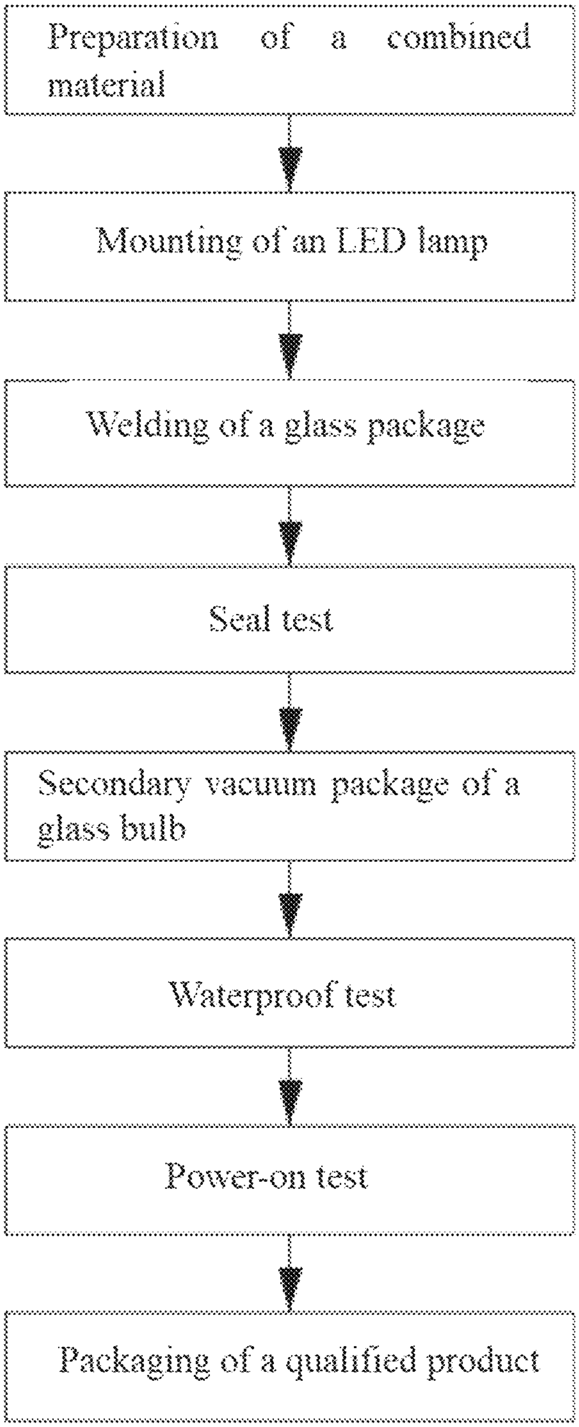
FIG. 1 is a flowchart of embodiments of an LED glass bulb and a manufacturing method thereof according to the present disclosure.

Reference numerals in the drawings: 1: lamp housing; 10: LED lamp; 11: glass package; 2: lighting chamber; 3: lamp base portion; 4: package body; 5: reflection element; 101: first electrode; 102: second electrode; and 6: shrinking package structure.

DETAILED DESCRIPTION OF THE EMBODIMENTS

Figure 2:
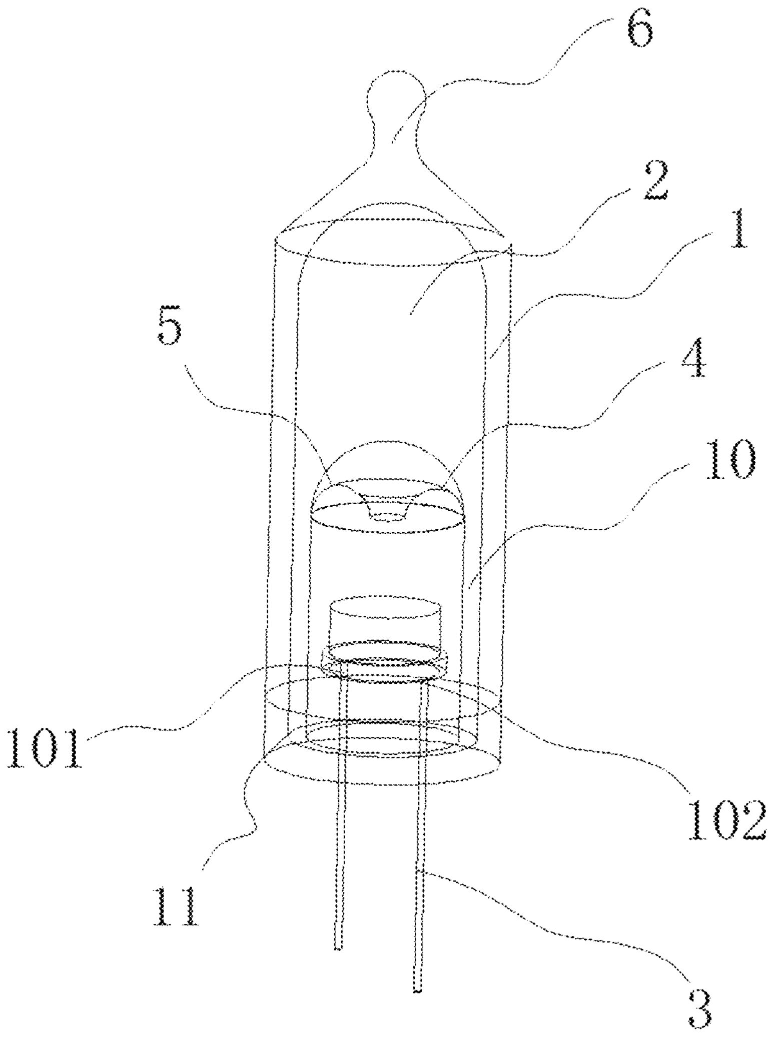
FIG. 2 is a schematic structural diagram of an LED lamp of embodiments of an LED glass bulb and a manufacturing method thereof according to the present disclosure.

Referring to FIG. 1 and FIG. 2, an LED glass bulb and a manufacturing process thereof of the present disclosure will be further explained.

For case of explanation, spatial relative terms such as "above", "below", "left", and "right" are used in the embodiments to explain a relationship between one component or feature shown in the figures and another component or feature. It should be understood that in addition to the orientations shown in the figures, spatial terms mean including different orientations of a device in use or operation. For example, if the device in the figures is placed upside down, a component described as being located "below" other components or features will be positioned "above" other components or features. Therefore, the exemplary term "below" can include both up and down orientations. The device can be positioned in other ways (rotated by 90 degrees or located at other orientations), and the spatial relative terms used here can be explained correspondingly.

Furthermore, relational terms such as "first" and "second" are used merely to distinguish one component from another component having the same name, instead of necessarily requiring or implying that these components have any of these actual relationships or orders.

A manufacturing process of an LED glass bulb specifically includes the following steps: S1, preparation of a combined material: processing, according to a size of a desired LED glass bulb, a lamp housing with a corresponding size, a glass package, and an LED lamp, wherein the lamp housing and the glass package are both made of a glass material;

S2, mounting of the LED lamp: placing the lamp housing vertically on a fixture in a manner that an opening of the lamp housing is upward, then placing a wick portion of the LED lamp in the lamp housing, causing a lamp base portion of the LED lamp to pass through the glass package, and finally performing transition fit on the glass package and an opening portion of the lamp housing;

S3, welding of the glass package: bonding the glass package with an inner wall of an opening in one side of the lamp housing through hot-melt bonding treatment, to connect the glass package to the lamp housing to form a semi-closed light-transmitting chamber;

S4, seal test: performing detecting the sealing of a lamp bead obtained in step S3 through seal test equipment, wherein a main detection method is to test an air pressure inside the lamp bead obtained in step S3 through pressurization, depressurization, and alternate pressurization and depressurization; a detected qualified product is then moved to a next step, and a detected unqualified product is placed in an unqualified product region;

S5, secondary vacuum package of the glass bulb: vacuumizing the light-transmitting chamber of the qualified product obtained in step S4, lowering the air pressure in the light-transmitting chamber to a set value, and heating and shrinking an opening in the other side of the lamp housing to achieve secondary vacuum package of the glass bulb;

S6, waterproof test: putting the vacuumized lamp bead into a test pool, placing the lamp bead below a water surface, carrying out a waterproof test on the lamp bead in a manner of gradually increasing a water pressure, moving a detected qualified product to a next step, and placing a detected unqualified product into the unqualified product region;

S7, power-on test: mounting the bulb on a live dedicated detection interface, checking whether a lighting portion of the LED bulb is lit up normally, moving a detected qualified product to a next step, and placing a detected unqualified product into the unqualified product region; and S8, packaging of the qualified product: packaging the qualified LED lamp obtained in step S7.

In the present disclosure, by the preparation of the combined material, the mounting of the LED lamp, the welding of the glass package, the seal test, the secondary vacuum package of the glass bulb, the waterproof test, the power-on test, the packaging of the qualified product, and the like, for the LED bulb, the glass package is welded to the LED lamp portion, and the secondary vacuum package is formed for the glass bulb. Due to the hot melting shrinking technology, vacuum treatment and package treatment are integrated, which achieves the integrality of the vacuum treatment and the shrinking package. The important step of sealing is integrated, which improves the sealing property of the lamp housing. The vacuum treatment is to prevent the LED lamp from being partially oxidized, which greatly prolongs the service life of the LED lamp. Moreover, due to the waterproof test, the LED lamp can adapt to different severe environments. By the final power-on test, the process can ensure a sufficient yield, which greatly improves the manufacturing effect of the manufacturing process.

Preferably, the seal test of step S4 includes the following specific steps: S40, mounting a to-be-detected bulb on a detection fixture, wrapping a detection valve outside the bulb, setting the detection valve to be corresponding to a glass package detection hole, and clamping and fixing the lamp base through the detection valve;

S41, setting both a maximum value of an air pressure change allowed in continuous pressurization and a maximum value of an air pressure change allowed in continuous depressurization to be K1, setting a maximum value of an air pressure change allowed in alternate pressurization and depressurization to be K2, and carrying out the seal test on the bulb after the setting;

S42, in the pressurization or depressurization stage, performing a pressurization or depressurization operation in the chamber according to a selected detection mode, monitoring the chamber by an air pressure detector in the detection valve in real time, and recording leakage values of the bulb in different pressure change states; when an air pressure in the lamp bead reaches an extreme value of pressurization or depressurization, stopping pressurization or depressurization, and entering a pressure maintaining stage; then detecting a variation of the air pressure in the chamber, and recording a detected pressure variation to be K;

S43, in the alternate pressurization and depressurization stage, controlling a pressure difference during the periodic pressurization and depressurization within ΔK, wherein within a time period T, a difference value between the highest pressure and the lowest pressure is less than ΔK; within the time period T, entering the pressure maintaining stage after the alternate pressurization and depressurization are carried out; then detecting a variation of the air pressure in the chamber, and recording a detected pressure variation to be Kt;

S44, in a comparison stage, if K is less than or equal to K1 and Kt is less than or equal to K2, indicating that the bulb is qualified; otherwise, indicating that the bulb is unqualified; and S45, removing the tested bulb, and repeating steps S40 to S44.

In the manufacturing process of the present disclosure, due to the seal test, by the three manners: pressurization, depressurization, and alternate pressurization and depressurization, the sealing performance of the lamp housing can be ensured by the strength of the lamp housing in a vacuum state. The pressurization, the depressurization, and the alternate pressurization and depressurization can make adequate preparations for preventing oxidization, for example, vacuumizing the lamp housing or filling the lamp housing with inert gas. Pre-simulation of the seal test greatly ensures that the lamp housing can adapt to different manufacturing operations and can ensure the welding strength between the lamp housing and the glass package.

Preferably, the waterproof test of step S6 includes the following specific steps: S60, placing the to-be-detected bulb on the detection fixture upside down, preparing a water reservoir, and clamping the lamp base through the detection fixture for the waterproof test;

S61, placing the bulb below a water surface of the water reservoir through the detection fixture for the waterproof test, and recording a state of a surface of the lamp bead;

S62, gradually increasing a water pressure of the water reservoir, setting a maximum water pressure value to be P, recording a state of the surface of the lamp bead; if there is an abnormality on the surface of the lamp bead, recording that there is a possibility of water leakage; and S63, after the test ends, detecting a bulb that is tested to be abnormal: first heating the bulb; controlling a heating temperature to be between 40° C. and 50° C. and heating time to be between 5 minutes and 10 minutes; after the heating is completed, adding room-temperature water to the surface of the bulb, observing changes in water mist in an inner cavity of the bulb; if there is water mist, indicating that the bulb is unqualified; and if there is no water mist, indicating that the bulb is qualified.

In the waterproof test of the present disclosure, an immersion method and a pressurization method are used for tests on different waterproof grades. Furthermore, by the step of first heating the bulb; controlling the heating temperature to be between 40° C. and 50° C. and the heating time to be between 5 minutes and 10 minutes; after the heating is completed, adding the room-temperature water to the surface of the bulb, observing changes in water mist in an inner cavity of the bulb; if there is water mist, indicating that the bulb is unqualified; and if there is no water mist, indicating that the bulb is qualified, the waterproof performance and practicability of the LED lamp are ensured.

An LED glass bulb manufactured by the above manufacturing process of the LED glass bulb includes a lamp housing 1; the lamp housing 1 is internally provided with a lighting chamber 2; an LED lamp 10 is placed in the lighting chamber 2 of the lamp housing 1; a lamp base portion 3 of the LED lamp 10 penetrates through a bottom end of the lamp housing 1 and extends out of the lamp housing 1;

the lighting chamber 2 of the lamp housing 1 is a vacuum region; the lamp base portion 3 of the LED lamp 10 and the lamp housing 1 are sealed by hot melting through a glass package 11; and the lamp housing 1 and the glass package 11 are both made of a glass material.

In the present disclosure, by the adoption of the lamp housing, the glass package 11 is first used to perform hot melting packaging, and the bulb is then vacuumized, so that the LED lamp in the lighting chamber 2 can be prevented from being oxidized, which prolongs the overall service life.

Preferably, the LED lamp 10 is provided with a package body 4; the package body 4 includes a coating structure arranged on the LED lamp 10 and a reflection element 5 arranged in the coating structure; and the coating structure is made of a resin material.

Preferably, the reflection element 5 includes a curved reflection region composed of several curved lenses and a planar reflection region composed of several planar lenses. Due to the above structure, the bulb can achieve diffuse reflection, so that emitted light is softer, and the use effect is better.

Preferably, the LED lamp 10 includes a first electrode 101 and a second electrode 102; and the first electrode 101 and the second electrode 102 are respectively connected to pin portions in a one-to-one corresponding manner.

Preferably, the lamp housing 1 is provided with a shrinking package structure 6; and the shrinking package structure 6 is a package tip formed by vacuumizing the lamp housing and heating to shrink an opening on the side of the lamp housing. In the embodiments of the present disclosure, the bulb is packaged by the hot melting shrinking, so that the integrality of the bulb is greatly improved, and the overall sealing effect can also be ensured.

Preferably, the LED lamp 10 is a straight LED lamp 10 or a patch LED lamp 10.

The air impermeability, the waterproof performance, and the service life of the LED glass bulb manufactured by the manufacturing process of the present disclosure are all improved. Furthermore, in the LED glass bulb, the lighting chamber 2 of the lamp housing 1 is vacuumized, so that the oxygen content in the lamp housing 1 is reduced, which prevents the LED lamp 10 from being partially oxidized and prolongs the service life of the LED lamp 10. Moreover, in the present disclosure, the package body 4 is used to package the LED lamp 10 and cooperates with the reflection element 5 arranged in the LED lamp 10. The reflection element 5 includes the curved reflection region composed of the several curved lenses and the planar reflection region composed of the several planar lenses, so that the LED lamp 10 has soft light, good lighting effect, simple structure, and high practicability.

The above embodiments are only preferred embodiments of the present disclosure are not intended to limit the present disclosure. Usual changes and substitutions made by those skilled in the art within the scope of the technical solution of the present disclosure all fall within the protection scope of the present disclosure.

What is claimed is:

1. A manufacturing process of a light-emitting diode (LED) glass bulb, comprising the following steps: S1, preparation of a combined material: processing, according to a size of a desired LED glass bulb, a lamp housing with a corresponding size, a glass package, and an LED lamp, wherein the lamp housing and the glass package are both made of a glass material;

S2, mounting of the LED lamp: placing the lamp housing vertically on a fixture in a manner that an opening of the lamp housing is upward, then placing a wick portion of the LED lamp in the lamp housing, causing a lamp base portion of the LED lamp to pass through the glass package, and finally performing transition fit on the glass package and an opening portion of the lamp housing;

S3, welding of the glass package: bonding the glass package with an inner wall of an opening in one side of the lamp housing through hot-melt bonding treatment, to connect the glass package to the lamp housing to form a semi-closed light-transmitting chamber;

S4, seal test: performing detecting the sealing of a lamp bead obtained in step S3 through seal test equipment, wherein a main detection method is to test an air pressure inside the lamp bead obtained in step S3 through pressurization, depressurization, and alternate pressurization and depressurization; a detected qualified product is then moved to a next step, and a detected unqualified product is placed in an unqualified product region;

S5, secondary vacuum package of the glass bulb: vacuumizing the light-transmitting chamber of the qualified product obtained in step S4, lowering the air pressure in the light-transmitting chamber to a set value, and heating and shrinking an opening in the other side of the lamp housing to achieve secondary vacuum package of the glass bulb;

S6, waterproof test: putting the vacuumized lamp bead into a test pool, placing the lamp bead below a water surface, carrying out a waterproof test on the lamp bead in a manner of gradually increasing a water pressure, moving a detected qualified product to a next step, and placing a detected unqualified product into the unqualified product region;

S7, power-on test: mounting the bulb on a live dedicated detection interface, checking whether a lighting portion of the LED bulb is lit up normally, moving a detected qualified product to a next step, and placing a detected unqualified product into the unqualified product region; and S8, packaging of the qualified product: packaging the detected qualified product obtained in step S7.

2. The manufacturing process of the LED glass bulb according to claim 1, wherein the seal test of step S4 comprises the following steps: S40, mounting a to-be-detected bulb on a detection fixture, wrapping a detection valve outside the bulb, setting the detection valve to be corresponding to a glass package detection hole, and clamping and fixing the lamp base through the detection valve;

S41, setting both a maximum value of an air pressure change allowed in continuous pressurization and a maximum value of an air pressure change allowed in continuous depressurization to be K1, setting a maximum value of an air pressure change allowed in alternate pressurization and depressurization to be K2, and carrying out the seal test on the bulb after the setting;

S42, in the pressurization or depressurization stage, performing a pressurization or depressurization operation in the chamber according to a selected detection mode, monitoring the chamber by an air pressure detector in the detection valve in real time, and recording leakage values of the bulb in different pressure change states; when an air pressure in the lamp bead reaches an extreme value of pressurization or depressurization, stopping pressurization or depressurization, and entering a pressure maintaining stage; then detecting a variation of the air pressure in the chamber, and recording a detected pressure variation to be K;

S43, in the alternate pressurization and depressurization stage, controlling a pressure difference during the periodic pressurization and depressurization within ΔK, wherein within a time period T, a difference value between the highest pressure and the lowest pressure is less than ΔK; within the time period T, entering the pressure maintaining stage after the alternate pressurization and depressurization are carried out; then detecting a variation of the air pressure in the chamber, and recording a detected pressure variation to be Kt;

S44, in a comparison stage, if K is less than or equal to K1 and Kt is less than or equal to K2, indicating that the bulb is qualified; otherwise, indicating that the bulb is unqualified; and S45, removing the tested bulb, and repeating steps S40 to S44.

3. The manufacturing process of the LED glass bulb according to claim 1, wherein the waterproof test of step S6 comprises the following steps: S60, placing the to-be-detected bulb on a detection fixture upside down, preparing a water reservoir, and clamping the lamp base through the detection fixture for the waterproof test;

S61, placing the bulb below a water surface of the water reservoir through the detection fixture for the waterproof test, and recording a state of a surface of the lamp bead;

S62, gradually increasing a water pressure of the water reservoir, setting a maximum water pressure value to be P, recording a state of the surface of the lamp bead; if there is an abnormality on the surface of the lamp bead, recording that there is a possibility of water leakage; and S63, after the test ends, detecting a bulb that is tested to be abnormal: first heating the bulb; controlling a heating temperature to be between 40° C. and 50° C. and heating time to be between 5 minutes and 10 minutes; after the heating is completed, adding room-temperature water to the surface of the bulb, observing changes in water mist in an inner cavity of the bulb; if there is water mist, indicating that the bulb is unqualified; and if there is no water mist, indicating that the bulb is qualified.

4. An LED glass bulb manufactured by the manufacturing process of the LED glass bulb according to claim 1, wherein the LED glass bulb comprises a lamp housing (1); the lamp housing (1) is internally provided with a lighting chamber (2); an LED lamp (10) is placed in the lighting chamber (2) of the lamp housing (1); a lamp base portion (3) of the LED lamp (10) penetrates through a bottom end of the lamp housing (1) and extends out of the lamp housing (1);

the lighting chamber (2) of the lamp housing (1) is a vacuum region; the lamp base portion (3) of the LED lamp (10) and the lamp housing (1) are sealed by hot melting through a glass package (11); and the lamp housing (1) and the glass package (11) are both made of a glass material.

5. The LED glass bulb according to claim 4, wherein the LED lamp (10) is provided with a package body (4); the package body (4) comprises a coating structure arranged on the LED lamp (10); and the coating structure is made of a resin material.

6. The LED glass bulb according to claim 4, wherein the LED lamp (10) comprises a first electrode (101) and a second electrode (102); and the first electrode (101) and the second electrode (102) are respectively connected to pin portions in a one-to-one corresponding manner.

7. The LED glass bulb according to claim 4, wherein the lamp housing (1) is provided with a shrinking package structure (6); and the shrinking package structure (6) is a package tip formed by vacuumizing the lamp housing and heating to shrink an opening on the side of the lamp housing.

8. The LED glass bulb according to claim 4, wherein the LED lamp (10) is a straight LED lamp (10) or a patch LED lamp (10).

* * * * *